United States Patent
Shah et al.

(10) Patent No.: US 11,809,390 B2
(45) Date of Patent: *Nov. 7, 2023

(54) CONTEXT-DEPENDENT EVENT CLEANING AND PUBLICATION

(71) Applicant: Intuit Inc., Mountain View, CA (US)

(72) Inventors: Shivang Bhadresh Shah, Newark, CA (US); Saharath Jay Jay Kleips, Sunnyvale, CA (US); Navjot Singh Cheema, Hayward, CA (US); Akbar Abdul Rangara, Austin, TX (US); Happy Bhairuprasad Somani, Fremont, CA (US); Jake Thomas Hilborn, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/388,826

(22) Filed: Jul. 29, 2021

(65) Prior Publication Data
US 2023/0029899 A1  Feb. 2, 2023

(51) Int. Cl.
*G06F 16/215* (2019.01)
*G06F 16/22* (2019.01)
*G06F 16/2455* (2019.01)
*G06F 16/25* (2019.01)

(52) U.S. Cl.
CPC ........ *G06F 16/215* (2019.01); *G06F 16/2282* (2019.01); *G06F 16/24568* (2019.01); *G06F 16/254* (2019.01)

(58) Field of Classification Search
None
See application file for complete search history.

(56) References Cited

U.S. PATENT DOCUMENTS

| | | |
|---|---|---|
| 7,120,597 B1 | 10/2006 | Knudtzon et al. |
| 7,140,035 B1 | 11/2006 | Karch |
| 7,240,028 B1 | 7/2007 | Rugge |
| 7,542,973 B2 | 6/2009 | Segal et al. |
| 7,925,551 B2 | 4/2011 | Hahn-Carlson et al. |
| 8,589,268 B2 | 11/2013 | Hahn-Carlson |
| 8,751,337 B2 | 6/2014 | Hahn-Carlson |
| 10,091,155 B1 | 10/2018 | Ledet |
| 10,528,367 B1 | 1/2020 | Liu et al. |
| 10,608,977 B1 | 3/2020 | Ledet |
| 10,698,733 B1 | 6/2020 | Lee et al. |
| 10,884,909 B1 | 1/2021 | Chatterjee |
| 11,138,372 B2 | 10/2021 | Guzman et al. |
| 11,315,119 B1* | 4/2022 | Hendry ............... G06Q 20/405 |

(Continued)

OTHER PUBLICATIONS

Shah et al., "Context-Dependent Message Extraction and Transformation," U.S. Appl. No. 17/388,784, filed Jul. 29, 2021.

(Continued)

*Primary Examiner* — Richard L Bowen
(74) *Attorney, Agent, or Firm* — Paradice & Li LLP

(57) ABSTRACT

Systems and methods for cleaning and publishing event messages. An example method includes receiving messages corresponding to a plurality of events, identifying, for a first event of the plurality of events, one or more changed tables, assigning an event type to the first event based at least in part on the one or more changed tables, and publishing the first event on an event streaming platform.

20 Claims, 11 Drawing Sheets

(56) References Cited

U.S. PATENT DOCUMENTS

| | | |
|---|---|---|
| 2003/0191710 A1 | 10/2003 | Green et al. |
| 2003/0212617 A1 | 11/2003 | Stone et al. |
| 2004/0049459 A1 | 3/2004 | Philliou et al. |
| 2004/0138937 A1 | 7/2004 | Hahn-Carlson |
| 2005/0075960 A1 | 4/2005 | Leavitt et al. |
| 2005/0078660 A1 | 4/2005 | Wood |
| 2005/0240531 A1 | 10/2005 | Wolff |
| 2005/0289237 A1 | 12/2005 | Matsubara et al. |
| 2007/0013968 A1 | 1/2007 | Ebaugh et al. |
| 2007/0271160 A1 | 11/2007 | Stone et al. |
| 2008/0091577 A1 | 4/2008 | Holmes et al. |
| 2008/0208780 A1 | 8/2008 | Hoopes et al. |
| 2009/0076951 A1* | 3/2009 | Szamel ............... G06Q 20/10 705/35 |
| 2010/0161362 A1 | 6/2010 | Shapira et al. |
| 2010/0189230 A1 | 7/2010 | Jackson et al. |
| 2011/0161215 A1 | 6/2011 | Reed et al. |
| 2012/0331486 A1* | 12/2012 | Bhattacharyya ... G06Q 10/0631 719/318 |
| 2013/0034216 A1 | 2/2013 | Jackson et al. |
| 2013/0318189 A1* | 11/2013 | Klein .................. H04L 51/224 709/206 |
| 2015/0161722 A1 | 6/2015 | Harp |
| 2015/0324872 A1 | 11/2015 | Daswani et al. |
| 2017/0039553 A1 | 2/2017 | Ghatage |
| 2017/0103455 A1 | 4/2017 | Schroeder et al. |
| 2018/0260467 A1* | 9/2018 | Stewart .................. G06F 16/27 |
| 2019/0171633 A1 | 6/2019 | Demla et al. |
| 2021/0110328 A1 | 4/2021 | Hsaio et al. |
| 2021/0157809 A1 | 5/2021 | Mor et al. |

OTHER PUBLICATIONS

Shah et al., "Multiple Source Audit Log Generation," U.S. Appl. No. 17/388,862, filed Jul. 29, 2021.

Auditboard, "What is an Audit Trail? Everything You Need to Know," found on https://www.auditboard.com/blog/what-is-an-audit-trail/, Jul. 26, 2021. (Year: 2021).

* cited by examiner

CONTEXT-DEPENDENT EVENT CLEANING AND PUBLICATION

TECHNICAL FIELD

This disclosure relates generally to processing of messages from a database, and more particularly to processing groups of messages each group corresponding to a common event or transaction.

DESCRIPTION OF RELATED ART

Many companies and other entities store an enormous amount of valuable data in databases. While such data is valuable, the architectures of such databases may prevent their full value from being realized, for example, due to legacy databases' failure to sufficiently support data cleansing, organization, extraction of historical data, and real time streaming of cleansed data. This may significantly impact the value and ease of use of this data by downstream consumers. For example, a company may desire to leverage this stored data for use with artificial intelligence (AI) or machine learning (ML) applications to improve search functionality, to improve near real time data analytics, and so on. However, without being able to extract, cleanse, and stream such data, these downstream uses may not be possible, or may be unacceptably difficult. As such, there is a need for a system that can not only cleanse and stream data extracted from conventional databases but also forward messages associated with data changes in the database to downstream systems in a manner that ensures all messages relating to a particular event or transaction are received by the downstream systems concurrently.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a method for cleaning and publishing event messages. The method may be performed by a computing device including or associated with a database, and may include receiving messages corresponding to a plurality of events. The method may include identifying, for a first event of the plurality of events, one or more tables of a database having at least one changed entry. The method may include assigning an event type to the first event based at least in part on the one or more identified tables of the database. The method may include publishing the first event on an event streaming platform based on the assigned event type. In some aspects, the messages corresponding to the plurality of events include two or more groups of messages, wherein each group of the two or more groups of messages corresponds to a respective event of the plurality of events.

In various implementations, the method may also include determining that a first table of the one or more identified tables of the database is a primary table, determining a change type corresponding to the first table, and assigning the change type as the event type for the first event. In some instances, the method may also include determining that none of the one or more identified tables of the database is a primary table, and assigning an update event type as the event type for the first event.

In some implementations, the method may include identifying, for the first event, at least a first change and a second change in a primary table of the database, and assigning the event type to the first event based at least in part on corresponding change types of the first and second changes. In some instances, the method may also include determining that the first change corresponds to a deletion in the primary table of the database, and assigning a deletion event type as the event type for the first event. In other instances, the method may also include determining that neither the first change nor the second change corresponds to a deletion in the primary table of the database, determining that the first change corresponds to an insertion in the primary table of the database, and assigning an insertion event type as the event type for the first event. In some other instances, the method may also include determining that neither the first change nor the second change corresponds to a deletion or an insertion in the primary table of the database, and assigning an update event type as the event type for the first event.

In some implementations, the method may also include identifying a second event and a third event that correspond to a common account, selecting one of the second event or the third event for publishing on the event streaming platform, and sending a message indicating denial of event publication to a source of the non-selected one of the second event or the third event. In some instances, the method may also include determining that the second event has a higher priority than the third event, and publishing the second event on the event streaming platform based on the determined higher priority. In other instances, the method may also include determining whether the second event or the third event has a most recent timestamp, and publishing, on the event streaming platform, the event of the second event or the third event having the most recent timestamp. In one implementation, the method may also include identifying sources of the second and third events, determining respective priorities of the identified sources of the second and third events, and publishing one of the second event or the third event based on the respective priorities.

Another innovative aspect of the subject matter described in this disclosure can be implemented in a computing system coupled to at least one database and an event streaming platform. An example system includes one or more processors coupled to a memory. The memory stores instructions that, when executed by the one or more processors, causes the system to receive messages corresponding to a plurality of events. Execution of the instructions causes the system to identify, for a first event of the plurality of events, one or more tables of a database having at least one changed entry. Execution of the instructions causes the system to assign an event type to the first event based at least in part on the one or more identified tables of the database. Execution of the instructions causes the system to publish the first event on an event streaming platform based on the assigned event type. In some aspects, the messages corresponding to the plurality of events include two or more groups of messages, wherein each group of the two or more groups of messages corresponds to a respective event of the plurality of events.

In various implementations, execution of the instructions causes the system to determine that a first table of the one or more identified tables of the database is a primary table, to determine a change type corresponding to the first table, and to assign the change type as the event type for the first event. In some instances, execution of the instructions also causes the system to determine that none of the one or more identified tables of the database is a primary table, and assigning an update event type as the event type for the first event.

In some implementations, execution of the instructions causes the system to identify, for the first event, at least a first change and a second change in a primary table of the database, and to assign the event type to the first event based at least in part on corresponding change types of the first and second changes. In some instances, execution of the instructions also causes the system to determine that the first change corresponds to a deletion in the primary table of the database, and assigning a deletion event type as the event type for the first event. In other instances, execution of the instructions also causes the system to determine that neither the first change nor the second change corresponds to a deletion in the primary table of the database, to determine that the first change corresponds to an insertion in the primary table of the database, and to assign an insertion event type as the event type for the first event. In some other instances, execution of the instructions also causes the system to determine that neither the first change nor the second change corresponds to a deletion or an insertion in the primary table of the database, and to assign an update event type as the event type for the first event.

In some implementations, execution of the instructions causes the system to identify a second event and a third event that correspond to a common account, to select one of the second event or the third event for publishing on the event streaming platform, and to send a message indicating denial of event publication to a source of the non-selected one of the second event or the third event. In some instances, execution of the instructions also causes the system to determine that the second event has a higher priority than the third event, and to publish the second event on the event streaming platform based on the determined higher priority. In other instances, execution of the instructions also causes the system to determine whether the second event or the third event has a most recent timestamp, and to publish, on the event streaming platform, the event of the second event or the third event having the most recent timestamp. In one implementation, execution of the instructions also causes the system to identify sources of the second and third events, to determine respective priorities of the identified sources of the second and third events, and to publish one of the second event or the third event based on the respective priorities.

Another innovative aspect of the subject matter described in this disclosure can be implemented in a non-transitory computer-readable storage medium of a system including or coupled to a database. The non-transitory computer-readable storage medium stores instructions that, when executed by one or more processors of the system, causes the system to perform a number of operations. In some implementations, the operations may include receiving messages corresponding to a plurality of events. The operations include identifying, for a first event of the plurality of events, one or more tables of a database having at least one changed entry. The operations include assigning an event type to the first event based at least in part on the one or more identified tables of the database. The operations include publishing the first event on an event streaming platform based on the assigned event type. In some aspects, the messages corresponding to the plurality of events include two or more groups of messages, wherein each group of the two or more groups of messages corresponds to a respective event of the plurality of events.

In various implementations, the operations also include determining that a first table of the one or more identified tables of the database is a primary table, determining a change type corresponding to the first table, and assigning the change type as the event type for the first event. In some instances, the operations also include determining that none of the one or more identified tables of the database is a primary table, and assigning an update event type as the event type for the first event.

In some implementations, the operations include identifying, for the first event, at least a first change and a second change in a primary table of the database, and assigning the event type to the first event based at least in part on corresponding change types of the first and second changes. In some instances, the operations also include determining that the first change corresponds to a deletion in the primary table of the database, and assigning a deletion event type as the event type for the first event. In other instances, the operations also include determining that neither the first change nor the second change corresponds to a deletion in the primary table of the database, determining that the first change corresponds to an insertion in the primary table of the database, and assigning an insertion event type as the event type for the first event. In some other instances, the operations also include determining that neither the first change nor the second change corresponds to a deletion or an insertion in the primary table of the database, and assigning an update event type as the event type for the first event.

In some implementations, the operations also include identifying a second event and a third event that correspond to a common account, selecting one of the second event or the third event for publishing on the event streaming platform, and sending a message indicating denial of event publication to a source of the non-selected one of the second event or the third event. In some instances, the operations also include determining that the second event has a higher priority than the third event, and publishing the second event on the event streaming platform based on the determined higher priority. In other instances, the operations also include determining whether the second event or the third event has a most recent timestamp, and publishing, on the event streaming platform, the event of the second event or the third event having the most recent timestamp. In one implementation, the operations also include identifying sources of the second and third events, determining respective priorities of the identified sources of the second and third events, and publishing one of the second event or the third event based on the respective priorities.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

Like numbers reference like elements throughout the drawings and specification.

DETAILED DESCRIPTION

Figure 1:
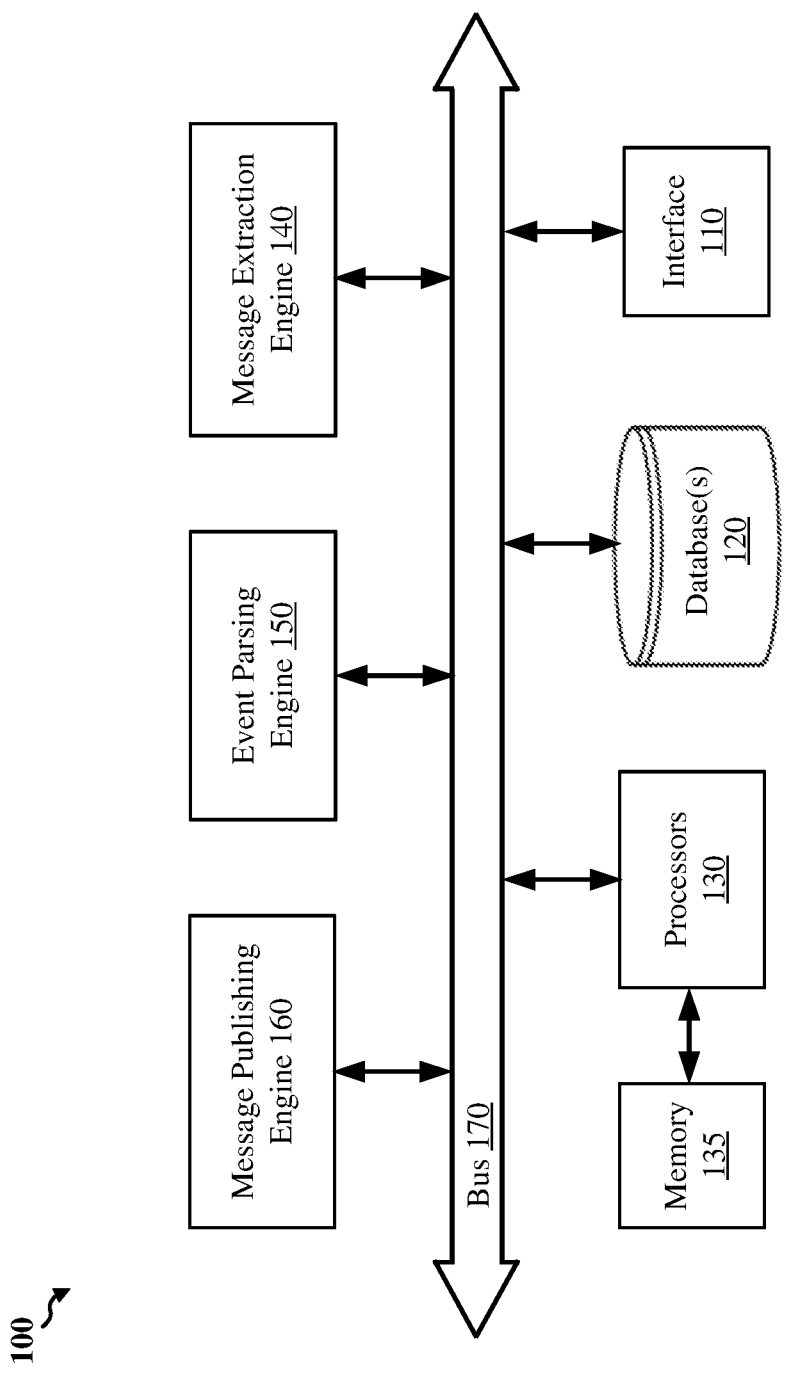
FIG. 1 shows a message cleaning and publishing system, according to some implementations.

Implementations of the subject matter described in this disclosure may be used to receive messages corresponding to a plurality of events or transactions associated with a database, identify one or more changed tables of the database for a first event of the plurality of events, assign an event type or change type to the first event based on the one or more changed tables, and publishing the first event on one or more event streaming platforms. Because an event or transaction may correspond to multiple changes in tables of the database, publishing events on the event streaming platform may require assigning the event type or change type to the event. However, given that the event may correspond to multiple changes in tables of the database, and thus multiple received messages, each table change may have its own change type, such as an entry creation, deletion, or update change type. Thus, assigning an appropriate event type or change type to the first event may be based on the change types of the changed tables associated with the first event. These and other aspects of the example implementations are discussed further below.

Various implementations of the subject matter disclosed herein provide one or more technical solutions to the technical problem of efficiently and accurately processing changes to tables in a database for provision to downstream systems and users. Example implementations may receive messages corresponding to a plurality of events, identify one or more changed tables corresponding to a first event of the plurality of events, and assign an event type to the first event based on the one or more changed tables. Further, example implementations may publish the first event on an event streaming platform. For example, each message may indicate a changed table in the database, and the change type may be assigned based on the change type of the changed tables corresponding to the first event. Further aspects may identify two events corresponding to a common account, and selectively publish only one of the two events on the event streaming platform, based on, for example, the source of the events, the timestamps corresponding to the events, or the source priority of the events. More specifically, various aspects of the present disclosure provide a unique computing solution to a unique computing problem that did not exist prior to electronic event streaming systems which process changes from one or more databases. As such, implementations of the subject matter disclosed herein are not an abstract idea such as organizing human activity or a mental process that can be performed in the human mind.

Moreover, various aspects of the present disclosure effect an improvement in the technical field of efficiently and accurately processing changes to tables in a database for provision to downstream systems and users. Identifying appropriate change types for events corresponding to multiple changed tables may allow for more accurate information to be provided to downstream users. Further, aspects of the present disclosure may enable such identification, assigning, and publishing to be performed more efficiently and using fewer processing resources as compared to conventional techniques. Receiving messages from a database corresponding to a plurality of events, identifying changed tables corresponding to each event, assigning an event type to each event, and publishing the events on the event streaming platform cannot be performed in the human mind, much less using pen and paper. In addition, implementations of the subject matter disclosed herein are usable with a wide variety of computing applications, and do far more than merely create contractual relationships, hedge risks, mitigate settlement risks, and the like, and therefore cannot be considered a fundamental economic practice.

Many companies and other entities store an enormous amount of valuable data in databases. While such data is valuable, the architectures of such databases may prevent their full value from being realized, for example due to legacy databases' failure to sufficiently support data cleansing, organization, extraction of historical data, and real time streaming of cleansed data. This may significantly impact the value and ease of use of this data by downstream consumers. For example, a company may desire to leverage this stored data for use with artificial intelligence (AI) or machine learning (ML) applications, for improving search functionality, for improving near real time data analytics, and so on. However, without being able to extract, cleanse, and stream such data, these downstream uses may not be possible, or may be unacceptably difficult.

In addition, when data extracted from one or more databases is streamed in real or near-real time, accurate use of the streamed data requires ensuring that downstream data consumers receive data corresponding to an accurate state of the databases. For example, a single event or transaction may result in changes in multiple tables in a database. Consider a simple example when inventory of a company moves from a warehouse to a store, a first message indicates a reduction in a table indicating the warehouse's inventory, while a second message indicates an increase in the store's inventory. If a downstream consumer of the data has received the first message but not the second, the consumer may make inferences, generate search results, and so on based on an inaccurate state of the company's inventory. Other common events and transactions may result in more complicated sets of changes, underlining the need for downstream data users to have an accurate state of the one or more databases. Conventional solutions may leverage parallel processing techniques to generate different threads for messages of different types; however, such techniques are difficult to extend, due to their configuration depending on the specific database message format and contents. Further, at the scale required for many databases, the computational complexity of such parallel processing techniques may be prohibitively computationally expensive.

Accordingly, aspects of the present disclosure provide methods and apparatus for extracting messages corresponding to events or transactions, such as messages representing changes in respective tables of one or more databases. Such messages may be received in real time or near-real time from the one or more databases or may include messages representing historical changes in the one or more databases. Further, aspects of the present disclosure may identify changes in tables which correspond to the same event, based on context. For example, each message corresponding to a single event or transaction may include a common identifier, and the changes in the tables represented by those messages identified as corresponding to the event or transaction. The messages corresponding to each event or transaction may be assigned a change type based on the changed tables, and then published to an event streaming platform or similar. This may ensure that the messages pertaining to a specific event or transaction are all assigned the same event type and are streamed together, so that downstream users of the streamed data have data representing an accurate state of the one or more databases.

In some aspects, tables in a database may be categorized according to table type. For example, some tables may be considered primary tables, while other tables may be considered secondary tables. A primary table may be a table including a primary key or other token or identifier indicating that the table is a primary table. Secondary tables may each be associated with a primary table but do not include the primary key. For example, consider a simple database including two tables, a secondary table including employee information, and a primary table including department information. In this example, the department id may be the primary key. The employee table may reference the department table to indicate the department for each employee. Thus, it may be important to consider whether changed tables are primary tables or secondary tables when assigning event types to groups of messages representing these changed tables.

FIG. 1 shows a message cleaning and publishing system 100, according to some implementations. Various aspects of the message cleaning and publishing system 100 disclosed herein may be applicable for cleaning and publishing event messages in a variety of computing applications. Such functionality may be useful for enabling a wide variety of downstream uses of data stored in a database, such as enabling search functions, data aggregation functions, data analytics, inference functions such as machine learning and neural network based inference functions, and so on.

The message cleaning and publishing system 100 is shown to include an input/output (I/O) interface 110, a database 120, one or more data processors 130, a memory 135 coupled to the data processors 130, a message extraction engine 140, an event parsing engine 150, and a message publishing engine 160. In some implementations, the various components of the message cleaning and publishing system 100 may be interconnected by at least a data bus 170, as depicted in the example of FIG. 1. In other implementations, the various components of the message cleaning and publishing system 100 may be interconnected using other suitable signal routing resources.

The interface 110 may include a screen, an input device, and other suitable elements that allow a user to provide information to the message cleaning and publishing system 100 and/or to retrieve information from the message cleaning and publishing system 100. Example information that can be provided to the message cleaning and publishing system 100 may include configuration information for the message cleaning and publishing system 100, such as information for configuring the message extraction engine 140, the event parsing engine 150, or the message publishing engine 160. For example, information for configuring the message extraction engine 140 may identify one or more databases from which messages are to be extracted, information for requesting historical messages from the one or more databases, message formatting information for the one or more databases, and so on. Configuration information for the event parsing engine 150 may include information for identifying changed tables corresponding to events in extracted messages, assigning event types to identified events, and so on. Configuration information for the message publishing engine 160 may include information identifying where groups of parsed messages should be published, such as one or more event streaming platforms, one or more databases, and so on. Example information that can be retrieved from the message cleaning and publishing system 100 may include groups of messages corresponding to events, configuration information for the message cleaning and publishing system 100, and the like.

The database 120, which may represent any suitable number of databases, may store any suitable information pertaining to configuration of the message cleaning and publishing system 100, may include or identify one or more databases including messages representing events to be processed by the message cleaning and publishing system 100, may include information pertaining to users of the message cleaning and publishing system 100, and so on. For example, the information pertaining to configuration may identify one or more databases from which messages are to be extracted, information for requesting historical messages from the one or more databases, message formatting information for the one or more databases, may include information for identifying changed tables corresponding to events in the extracted messages, may include information for identifying which messages correspond to a common event, such as one or more common identifiers present in each message corresponding to the event, may include information for assigning event types to events, may include information identifying where messages representing the events should be published, such as one or more event streaming platforms, one or more databases, and so on. In some implementations, the database 120 may be a relational database capable of presenting the information as data sets to a user in tabular form and capable of manipulating the data sets using relational operators. In some aspects, the database 120 may use Structured Query Language (SQL) for querying and maintaining the database 120. In some aspects, the database 120 may include or be coupled to a QuickBooks Online (QBO) database, from Intuit, Inc.

The data processors 130, which may be used for general data processing operations (such as manipulating the data sets stored in the database 120), may be one or more suitable processors capable of executing scripts or instructions of one or more software programs stored in the message cleaning and publishing system 100 (such as within the memory 135). The data processors 130 may be implemented with a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the data processors 130 may be implemented as a combination of computing devices (such as a combination of a DSP and a microprocessor, a plurality of microprocessors, one or more microprocessors in conjunction with a DSP core, or any other such configuration).

The memory 135, which may be any suitable persistent memory (such as non-volatile memory or non-transitory memory) may store any number of software programs, executable instructions, machine code, algorithms, and the like that can be executed by the data processors 130 to perform one or more corresponding operations or functions. In some implementations, hardwired circuitry may be used in place of, or in combination with, software instructions to implement aspects of the disclosure. As such, implementations of the subject matter disclosed herein are not limited to any specific combination of hardware circuitry and/or software.

The message extraction engine 140 may extract messages representing a plurality of events from one or more databases included in or coupled to the message cleaning and publishing system 100, such as via the bus 170 or via one or more network interfaces. For example, each extracted message may represent a real time or recent change to the one or more databases or may represent historical changes to the one or more databases. As discussed in more detail below, the message extraction engine 140 may receive the messages representing real time or recent changes from the one or more databases shortly after the changes occur or may receive the messages representing historical changes from the one or more databases in response to a request from the message extraction engine 140. In some aspects, multiple messages may correspond to the same event or transaction.

The event parsing engine 150 may be used to identify changed tables corresponding to events in the extracted messages and to assign event types to those events based on the changed tables. For example, an event may correspond to multiple extracted messages, and each extracted message corresponding to an event may include a common identifier. In some aspects, each common identifier may correspond to a common transaction, a common business entity, a common project, and so on. The event parsing engine 150 may also assign an event type or change type to each group of messages representing the same event, such as a creation change type, an update change type, a deletion change type, and so on. The change type may be assigned based on the types of changes pertaining to the messages in the group and on whether the changes in the messages of the group include changes to a primary table or a secondary table.

The message publishing engine 160 may publish the parsed messages on one or more systems or platforms, such as one or more event streaming platforms (such as Apache Kafka). For example, the groups of messages may be forwarded in real time, periodically, or in any other suitable manner.

The particular architecture of the message cleaning and publishing system 100 shown in FIG. 1 is but one example of a variety of different architectures within which aspects of the present disclosure may be implemented. For example, in other implementations, the message cleaning and publishing system 100 may not include the message extraction engine 140, the functions of which may be implemented by the processors 130 executing corresponding instructions or scripts stored in the memory 135. In some other implementations, the functions of the event parsing engine 150 may be performed by the processors 130 executing corresponding instructions or scripts stored in the memory 135. Similarly, the functions of the message publishing engine 160 may be performed by the processors 130 executing corresponding instructions or scripts stored in the memory 135.

Figure 2:
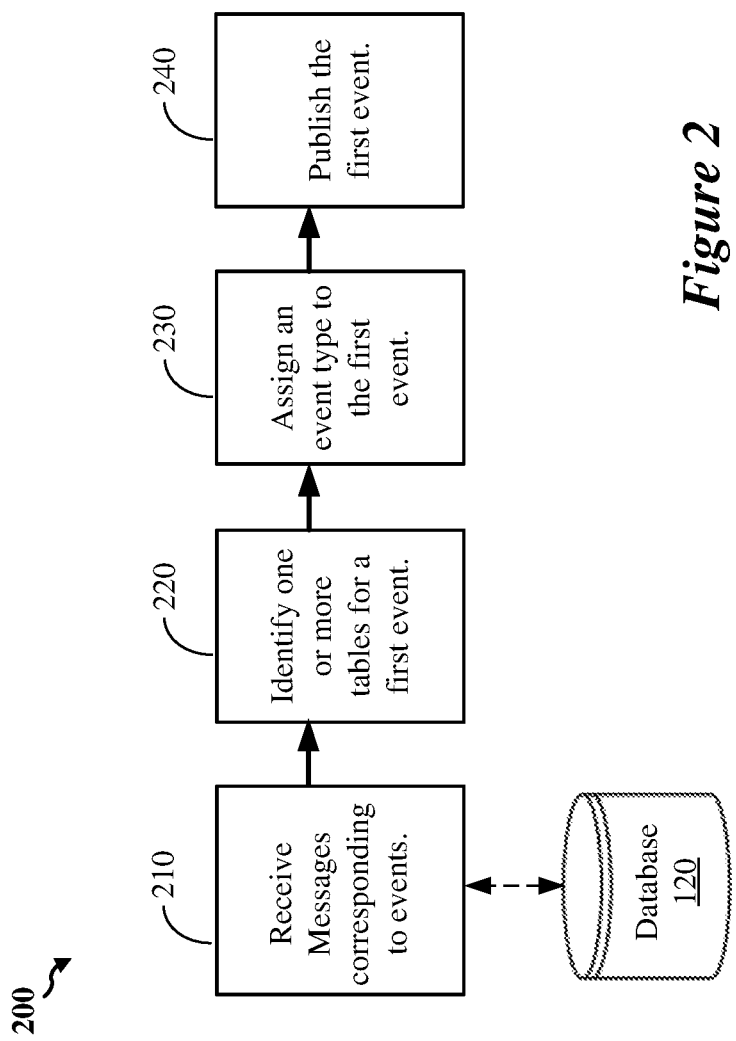
FIG. 2 shows a high-level overview of an example process flow that may be employed by the message cleaning and publishing system of FIG. 1.

FIG. 2 shows a high-level overview of an example process flow 200 that may be employed by the message cleaning and publishing system 100 of FIG. 1. In block 210, the message cleaning and publishing system 100 receives messages corresponding to a plurality of events. For example, the messages may be received using the message extraction engine 140 via the interface 110 or retrieved from the database 120 or another database coupled to the message cleaning and publishing system 100. The messages may represent recent or real time changes in one or more tables of the database or may represent historical changes in one or more tables of the database. In block 220, the message cleaning and publishing system 100 identifies one or more changed tables corresponding to a first event of the plurality of events. For example, the event parsing engine 150 may identify the changed tables using configuration data retrieved from the database 120 or received via one or more network interfaces coupled to the message cleaning and publishing system 100. In some examples, each message corresponding to the first event may include a common identifier. In some examples, the common identifier may be an identifier indicating a common transaction for each message corresponding to the first event, a common business entity associated with each message corresponding to the first event, a common purpose associated with each message corresponding to the first event, and so on. In block 230, an event type is assigned to the first event based on the changed tables. For example, the event parsing engine 150 may assign the event type based on the changed tables identified for the first event and the respective table types of the changed tables. In some aspects, the table types may identify tables as either primary or secondary. A table may be a primary table when it includes a token or other unique identifier, while a secondary table may not include the token or other unique identifier. In block 240, the first event may be published on one or more systems or platforms. For example, the message forwarding engine 160 may forward the parsed groups of messages to an event streaming platform.

Figure 3:
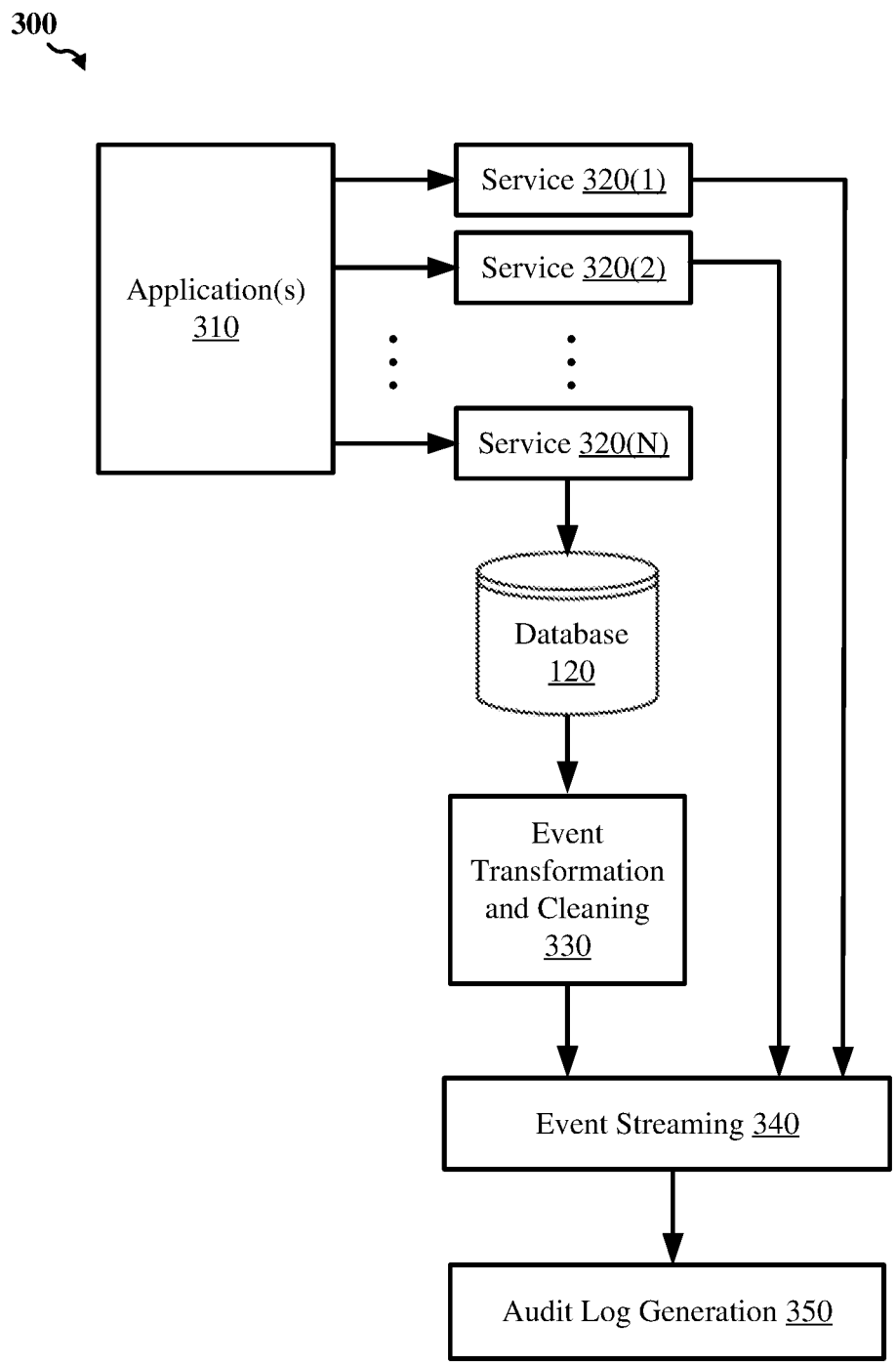
FIG. 3 shows a block diagram of an audit log generation system, according to some implementations.

FIG. 3 shows a block diagram of an audit log generation system 300, according to some implementations. One or more applications 310 may be coupled to a plurality 320 (1)-320(N) of services (collectively services 320). Each service of the services 320 may be a data source, such as a microservice, an application service, a database, and so on. Each service of the services 320 may perform operations using data from the applications 310. For example, the services 320 may obtain data from the applications 310 via one or more application user interfaces (not shown for simplicity). The services 320 may generate a plurality of messages each message corresponding to one or more of the performed operations. For some services, the generated messages may be provided to a database 120. The messages provided to the database 120 may then optionally be extracted by event transformation and cleaning 330. The event transformation and cleaning 330 may extract messages from the database 120, parse the extracted messages into groups of messages sharing a common identifier, and forward the groups of messages to the event streaming platform 340. Event streaming platform 340 may be any suitable event streaming platform, such as Apache Kafka. In some other aspects, messages generated by services of the services 320 may be provided directly to the event streaming platform 340. Note that while FIG. 3 shows the services 320 providing the messages to the event streaming platform 340, that in some other aspects, the event streaming platform 340 may be omitted. The messages generated by the services 320, and optionally the groups of messages from the event transformation and cleaning 330, may then be provided to audit log generation 350. Audit log generation 350 may be one example of the audit log generation system 100 of FIG. 1. Audit log generation 350 generates entries in an audit log corresponding to groups of one or more received messages, based on a determination that each message in a group corresponds to a common event or transaction. Entries in the audit log are thereby generated to include information from relevant messages from the services 320.

Figure 4A:
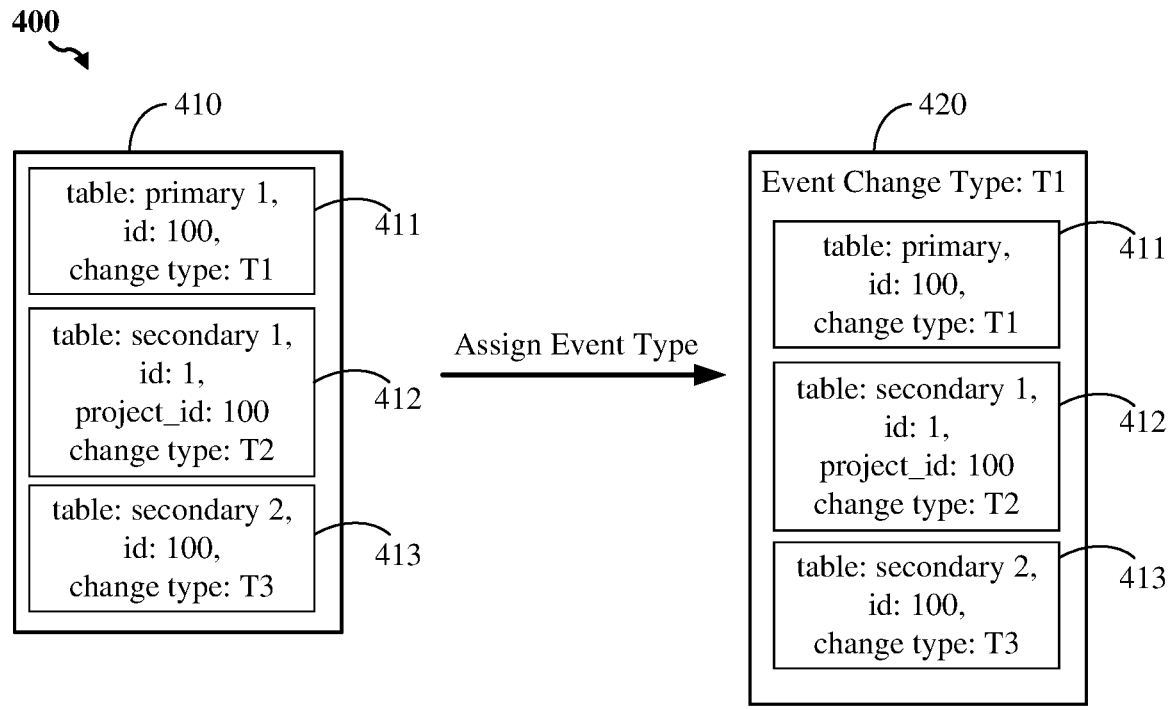
FIG. 4A shows an example event type assignation, according to some implementations.

FIG. 4A shows an example event type assignation 400, according to some implementations. An event 410 may correspond to changes in three tables, respectively indicated in message 411, message 412, and message 413. Note that only message 411 reflects a change in a primary table, primary table 1, while messages 412 and 413 reflect changes in secondary tables 1 and 2. Additionally, each message of messages 411-413 indicates a change type. While FIG. 4A illustrates these change types as T1, T2, and T3, in some aspects, each change type may be an entry creation change type, an entry update change type, or an entry deletion change type. According to some implementations, when an event involves a change to a primary table, the change type for the change to the primary table may be assigned to the event as a whole. In FIG. 4A, the change type of message 411 is T1. Consequently, the change type assigned to the event is also T1 and is indicated in assigned event 420, which includes each of the messages 411-413. Thus, if the change to the primary table is an entry creation type, then the event is assigned the entry creation type, and similarly with entry update or entry deletion types.

Figure 4B:
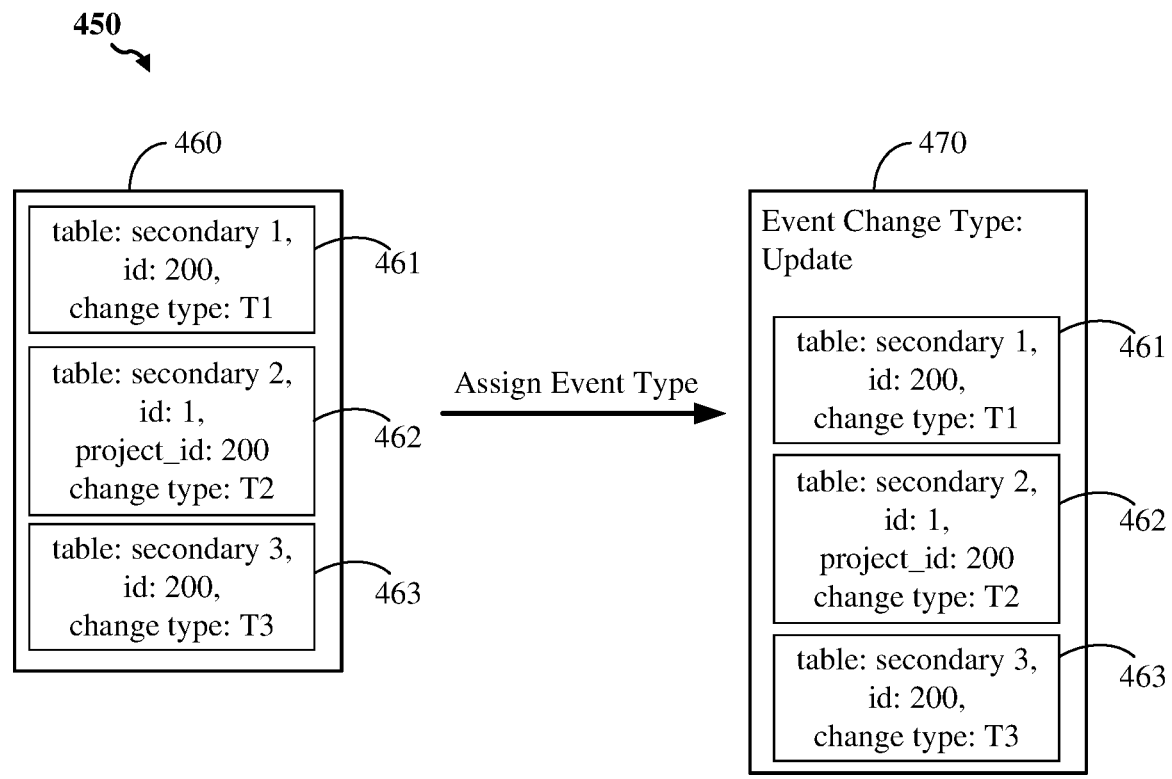
FIG. 4B shows another example event type assignation, according to some implementations.

FIG. 4B shows another example event type assignation 450, according to some implementations. Similar to FIG. 4A, an event 460 may correspond to changes in three tables, indicated by messages 461, 462, and 463. However, none of the changes are to a primary table, but instead to three secondary tables. When an event does not involve a change to a primary table, the change type for the event may be assigned to be a predetermined change type, such as an entry update change type, as shown in assigned event 470.

Figure 4C:
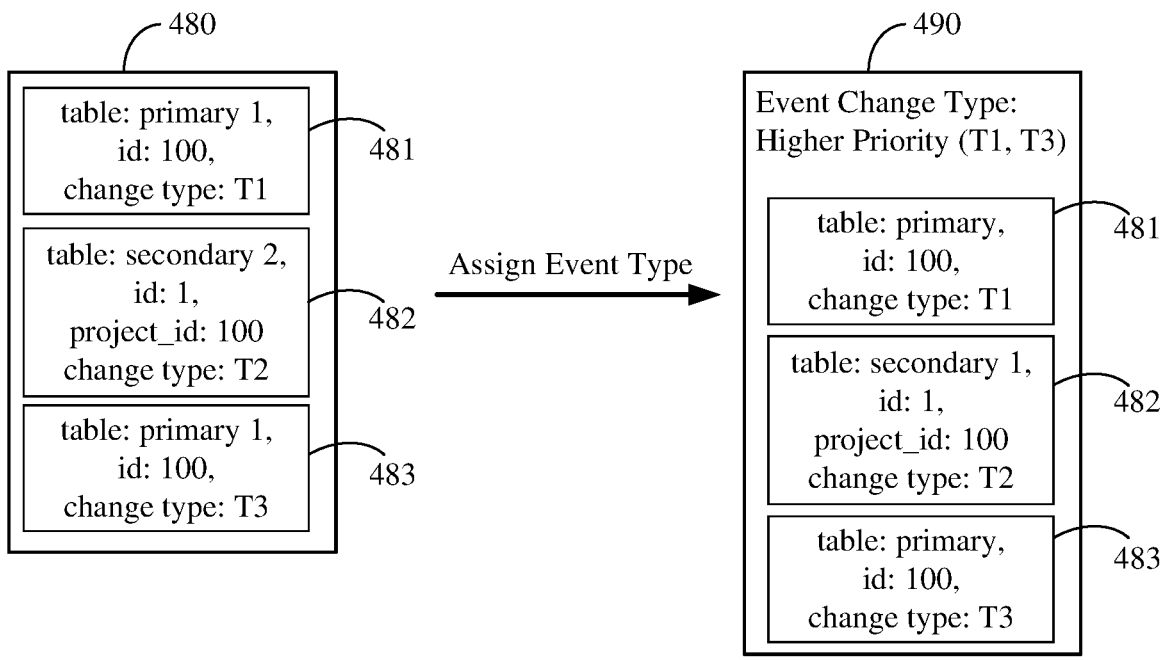
FIG. 4C shows another example event type assignation, according to some implementations.

FIG. 4C shows another example event type assignation 470, according to some implementations. Similar to FIGS. 4A and 4B, event 480 may correspond to changes to three tables, indicated by messages 481, 482, and 483. However, both messages 481 and 483 indicate changes to primary table 1, having respective change types of T1 and T3, while message 482 indicates a change to secondary table 2. Because both messages 481 and 483 reflect primary table changes, the event change type for the event 480 may be based on change types T1 and T3. More particularly, the change type assigned to the event 480 in assigned event 490 may be whichever of types T1 and T3 has the higher priority. In some aspects, the highest priority change type may be an entry deletion change type, while an entry creation change type may have a second highest priority, and an entry update change type may have a lowest priority. Thus, if one of change types T1 and T3 is an entry deletion change type, then the change type assigned to event 480 may be entry deletion. Similarly, if neither change type T1 nor change type T3 is a deletion change type, but one of T1 and T3 is an entry creation change type, then the change type assigned to event 480 may be entry creation. If neither change type T1 nor T3 is entry creation or entry deletion, then the change type assigned to event 480 may be entry update.

Note that while the events depicted in FIGS. 4A-4C are shown to correspond to three messages each, this depiction is for simplicity only, and in other examples events may correspond to one or more messages each, and event change types may be assigned as discussed above with regard to FIGS. 4A-4C. Note further that the messages shown in FIGS. 4A-4C have been simplified and may include other entries and fields not depicted in FIGS. 4A-4C. For example, each message may also include a value for the changed entry, in addition to other information associated with the changed entry, but such information has been omitted for simplicity. Similarly, the messages may indicate tables having any suitable names, referring to whichever transactions, accounts, entities, assets, or other information are relevant to the database contents.

While the above described examples receive groups of messages corresponding to events, in some other aspects, a plurality of messages corresponding to changes in tables of a database may be extracted from a database, and the event parsing engine 150 may parse the extracted messages into the groups of messages each corresponding to an event. For example, the plurality of messages may be extracted from the database via a platform such as Oracle GoldenGate. As discussed above, publishing the entire plurality of extracted messages at once may be disadvantageous due to the bandwidth and processing resources required for forwarding and processing such large messages. Thus, forwarding the plurality of extracted messages may not be desirable. Similarly, forwarding the messages individually may result in downstream data consumers having an inaccurate database state, depending on the timing of reception of the messages. Thus, parsing the messages into groups of messages, where each group corresponds to an event or transaction, may be a more desirable alternative.

For example, messages may be parsed into groups based on each message in a group containing a common identifier. Such an identifier may be any suitable identifier, such as an account identifier, a company identifier, a business entity identifier, a project identifier, and so on. With regard to FIGS. 4A-4C, such a common identifier may be the "id" field of the primary table and the "project_id" field of the secondary tables. For example, in event 410 of FIG. 4A, the common identifier of "100" is found in each of messages 411, 412, and 413. In some aspects, the common identifier may be a unique identifier identifying a company or another entity. Messages having a common identifier may therefore be grouped together, ensuring that, so that all changes pertaining to that identifier may be forwarded together. For example, when the common identifier identifies an account or a company, such grouping may ensure that downstream data consumers receive all changes pertaining to that account or company at the same time, ensuring that downstream data consumers do not make inferences or take other actions based on an inaccurate database state. More particularly, as described above with regard to the simple example of a company's inventory moving from a warehouse to a store, this grouping may ensure that the first message indicating the reduction the warehouse's inventory is forwarded together with the second message indicating the increase in the store's inventory, ensuring that downstream data consumers maintain an accurate state of the company's inventory.

While the above implementations have been described with regard to messages received from a single source, such as a single database, or a single application which provides messages from the database, in some other implementations, two or more sources may provide messages to the message cleaning and publishing system 100. For example, a first source may provide messages corresponding to real time or near real time changes in tables of the database, while a second source may provide messages corresponding to historical changes in tables of the database. When two events reflecting changes to the same table or account are received, one from each source, in some implementations the message cleaning and publishing system 100 may selectively publish only one of the two events. In some aspects, the first source may have priority over the second source, such that whenever one event is received from each source, the event received from the first source is published, while the event received from the second source may not be published. For example, this may be because real time or near real time events are prioritized over historical events, such that the events received from the first source are more recent and reflect more accurate and timely states of the tables of the database. In some other aspects, each message associated with an event may include a timestamp, and the event having the more recent timestamp may be published, and the event having the less recent timestamp may not be published. In some aspects, when a received event is not published, the message cleaning and publishing system 100 may send an acknowledgment to the source of the event which is not published.

Figure 5:
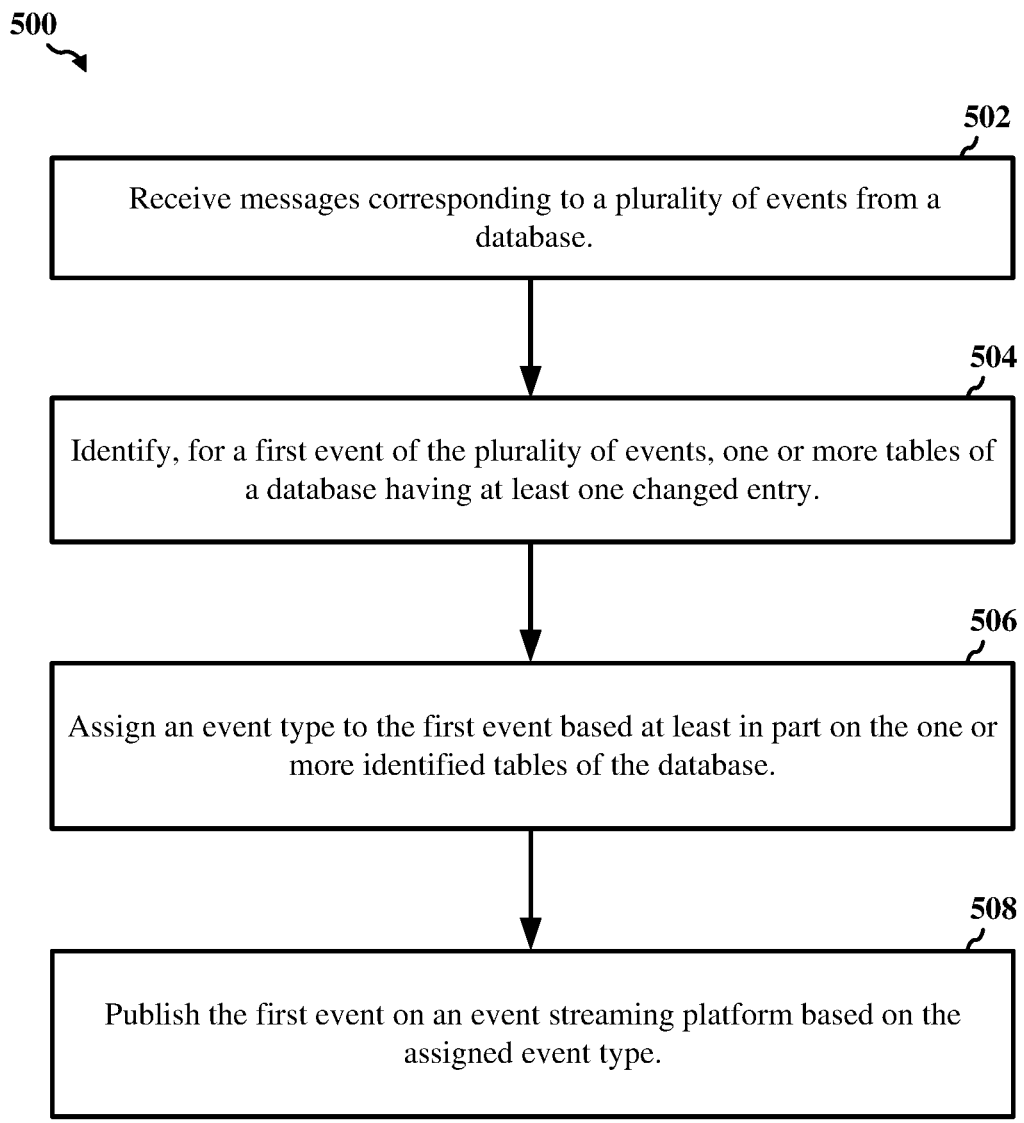
FIG. 5 shows an illustrative flow chart depicting an example operation for parsing and publishing event messages, according to some implementations.

FIG. 5 shows an illustrative flow chart depicting an example operation 500 for parsing and publishing event messages. The example operation 500 may be performed by one or more processors of a computing device including or coupled to one or more databases storing the event messages, such as the message cleaning and publishing system 100 of FIG. 1. In other implementations, the example operation 500 may be performed by any suitable systems, computers, or servers.

At block 502, the message cleaning and publishing system 100 receives messages corresponding to a plurality of events from a database. At block 504, the message cleaning and publishing system 100 identifies, for a first event of the plurality of events, one or more tables of the database having at least one changed entry. At block 506, the message cleaning and publishing system 100 assigns an event type to the first event based at least in part on the one or more identified tables of the database. At block 508, the message cleaning and publishing system 100 publishes the first event on an event streaming platform based on the assigned event type.

Figure 6:
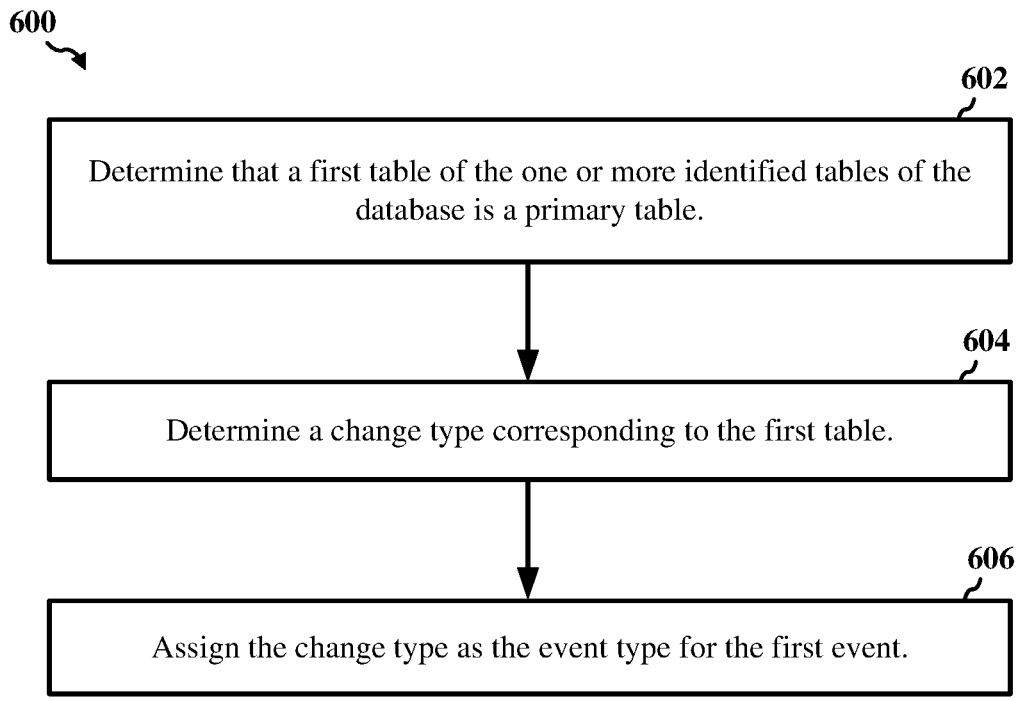
FIG. 6 shows an illustrative flow chart depicting an example operation for assigning change types to events, according to some implementations.

FIG. 6 shows an illustrative flow chart depicting an example operation 600 for assigning change types to events, according to some implementations. The example operation 600 may be performed by one or more processors of a computing device including or associated with the database, such as the message parsing and forwarding system 100 of FIG. 1. In other implementations, the example operation 600 may be performed by any suitable systems, computers, or servers. In various implementations, the operation 600 may be performed after the example operation 500 described with reference to FIG. 5. For example, at block 602, the message cleaning and publishing system 100 determines that a first table of the one or more identified tables of the database is a primary table. At block 604, the message cleaning and publishing system 100 determines a change type corresponding to the first table. At block 606, the message cleaning and publishing system 100 assigns the change type as the event type for the first event.

Figure 7:
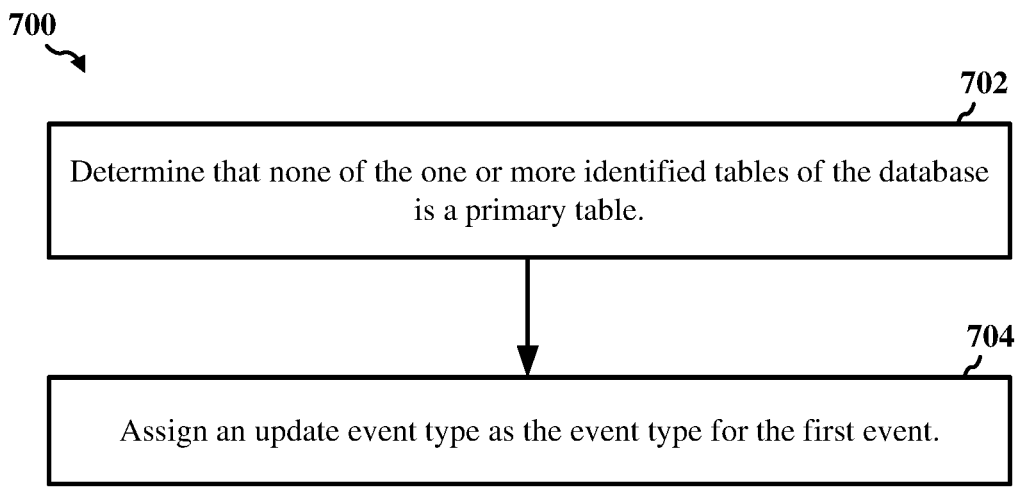
FIG. 7 shows an illustrative flow chart depicting another example operation for assigning change types to events, according to some implementations.

FIG. 7 shows an illustrative flow chart depicting another example operation 700 for assigning change types to events, according to some implementations. The example operation 700 may be performed by one or more processors of a computing device including or associated with the database, such as the message parsing and forwarding system 100 of FIG. 1. In other implementations, the example operation 700 may be performed by any suitable systems, computers, or servers. In various implementations, the operation 700 may be performed after the example operation 500 described with reference to FIG. 5. For example, at block 702, the message cleaning and publishing system 100 determines that none of the one or more identified tables of the database is a primary table. At block 704, the message cleaning and publishing system 100 assigns an update event type as the event type for the first event.

Figure 8:
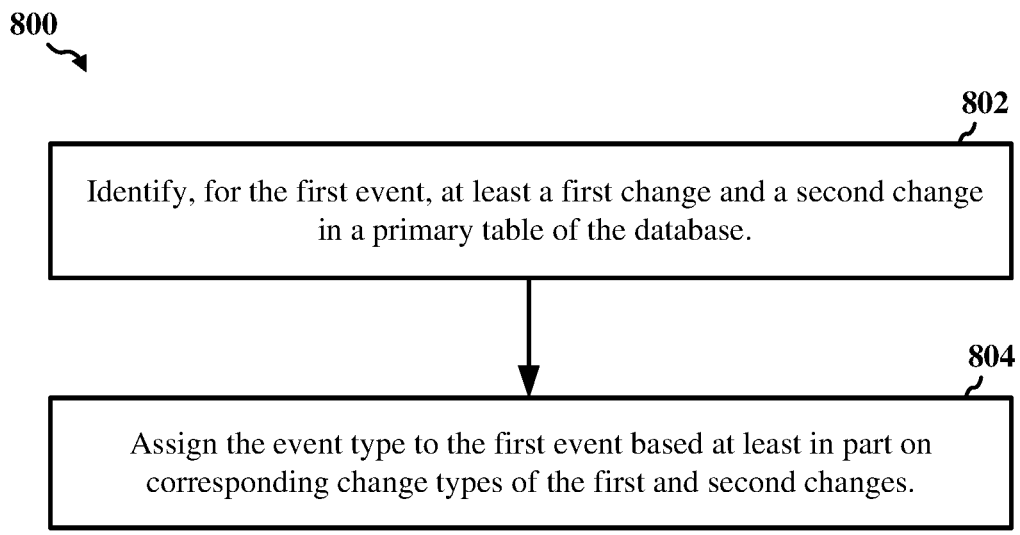
FIG. 8 shows an illustrative flow chart depicting another example operation for assigning change types to events, according to some implementations.

FIG. 8 shows an illustrative flow chart depicting another example operation 800 for assigning change types to events, according to some implementations. The example operation 800 may be performed by one or more processors of a computing device including or associated with the database, such as the message parsing and forwarding system 100 of FIG. 1. In other implementations, the example operation 800 may be performed by any suitable systems, computers, or servers. In various implementations, the operation 800 may be performed after the example operation 500 described with reference to FIG. 5. For example, at block 802, the message cleaning and publishing system 100 identifies, for the first event, at least a first change and a second change in a primary table of the database. At block 804, the message cleaning and publishing system 100 assigns the event type to the first event based at least in part on corresponding change types of the first and second changes.

Figure 9:
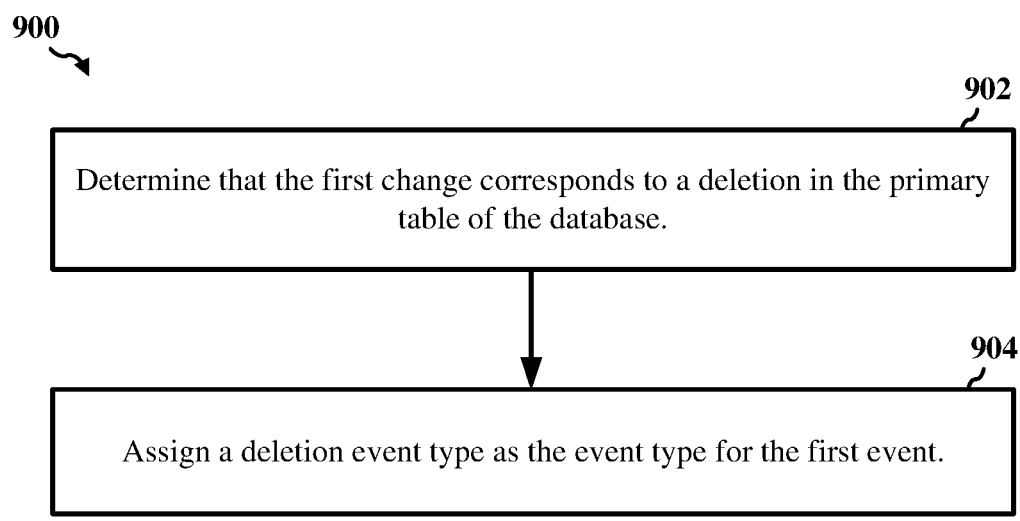
FIG. 9 shows an illustrative flow chart depicting another example operation for assigning change types to events, according to some implementations.

FIG. 9 shows an illustrative flow chart depicting another example operation 900 for assigning change types to events, according to some implementations. The example operation 900 may be performed by one or more processors of a computing device including or associated with the database, such as the message parsing and forwarding system 100 of FIG. 1. In other implementations, the example operation 900 may be performed by any suitable systems, computers, or servers. In various implementations, the operation 900 may be performed after the example operation 800 described with reference to FIG. 8. For example, at block 902, the message cleaning and publishing system 100 determines that the first change corresponds to a deletion in the primary table of the database. At block 904, the message cleaning and publishing system 100 assigns a deletion event type as the event type for the first event.

Figure 10:
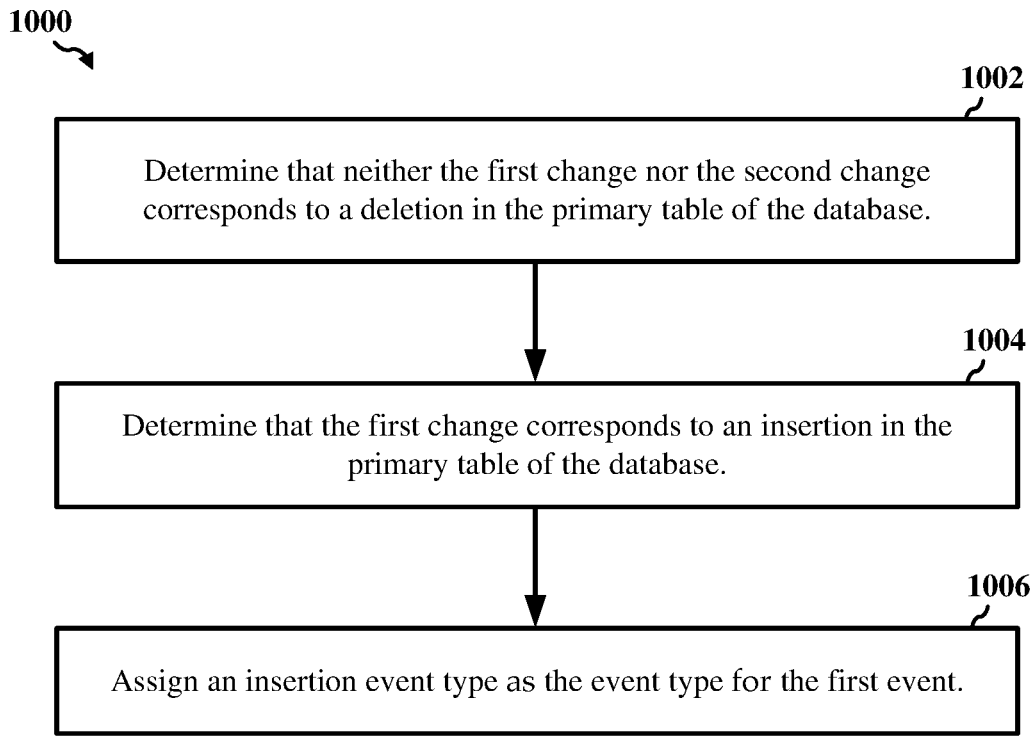
FIG. 10 shows an illustrative flow chart depicting another example operation for assigning change types to events, according to some implementations.

FIG. 10 shows an illustrative flow chart depicting another example operation 1000 for assigning change types to events, according to some implementations. The example operation 1000 may be performed by one or more processors of a computing device including or associated with the database, such as the message parsing and forwarding system 100 of FIG. 1. In other implementations, the example operation 1000 may be performed by any suitable systems, computers, or servers. In various implementations, the operation 1000 may be performed after the example operation 800 described with reference to FIG. 8. For example, at block 1002, the message cleaning and publishing system 100 determines that neither the first change nor the second change corresponds to a deletion in the primary table of the database. At block 1004, the message cleaning and publishing system 100 determines that the first change corresponds to an insertion in the primary table of the database. At block 1006, the message cleaning and publishing system 100 assigns an insertion event type as the event type for the first event.

Figure 11:
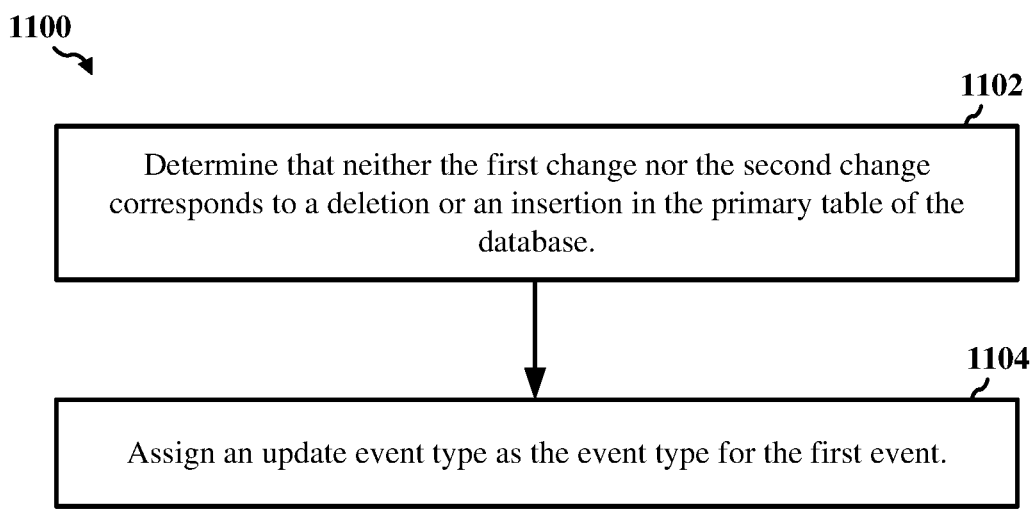
FIG. 11 shows an illustrative flow chart depicting another example operation for assigning change types to events, according to some implementations.

FIG. 11 shows an illustrative flow chart depicting another example operation 1100 for assigning change types to events, according to some implementations. The example operation 1100 may be performed by one or more processors of a computing device including or associated with the database, such as the message parsing and forwarding system 100 of FIG. 1. In other implementations, the example operation 1100 may be performed by any suitable systems, computers, or servers. In various implementations, the operation 1100 may be performed after the example operation 800 described with reference to FIG. 8. For example, at block 1102, the message cleaning and publishing system 100 determines that neither the first change nor the second change corresponds to a deletion or an insertion in the primary table of the database. At block 1104, the message cleaning and publishing system 100 assigns an update event type as the event type for the first event.

Figure 12:
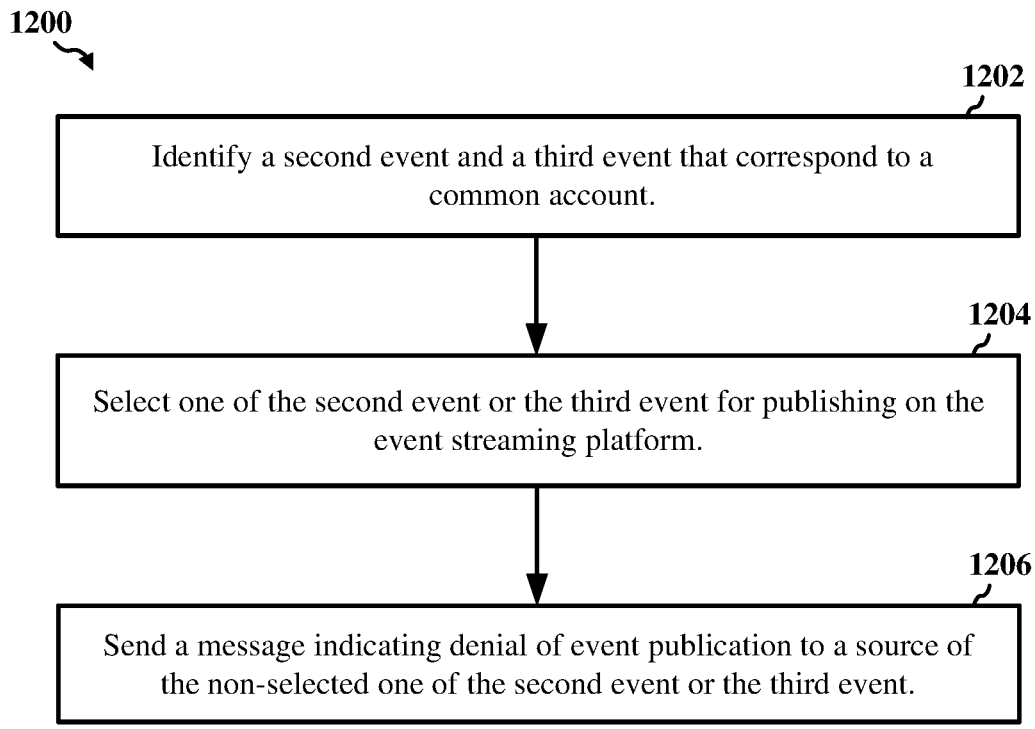
FIG. 12 shows an illustrative flow chart depicting an example operation for sending indications of denial of event publication, according to some implementations.

FIG. 12 shows an illustrative flow chart depicting an example operation 1200 for indicating denial of event publication, according to some implementations. The example operation 1200 may be performed by one or more processors of a computing device including or associated with the database, such as the message parsing and forwarding system 100 of FIG. 1. In other implementations, the example operation 1200 may be performed by any suitable systems, computers, or servers. In various implementations, the operation 1200 may be performed after the example operation 500 described with reference to FIG. 5. For example, at block 1202, the message cleaning and publishing system 100 identifies a second event and a third event that correspond to a common account. At block 1204, the message cleaning and publishing system 100 selects one of the second event or the third event for publishing on the event streaming platform. At block 1206, the message cleaning and publishing system 100 sends a message indicating denial of event publication to a source of the non-selected one of the second event or the third event.

Figure 13:
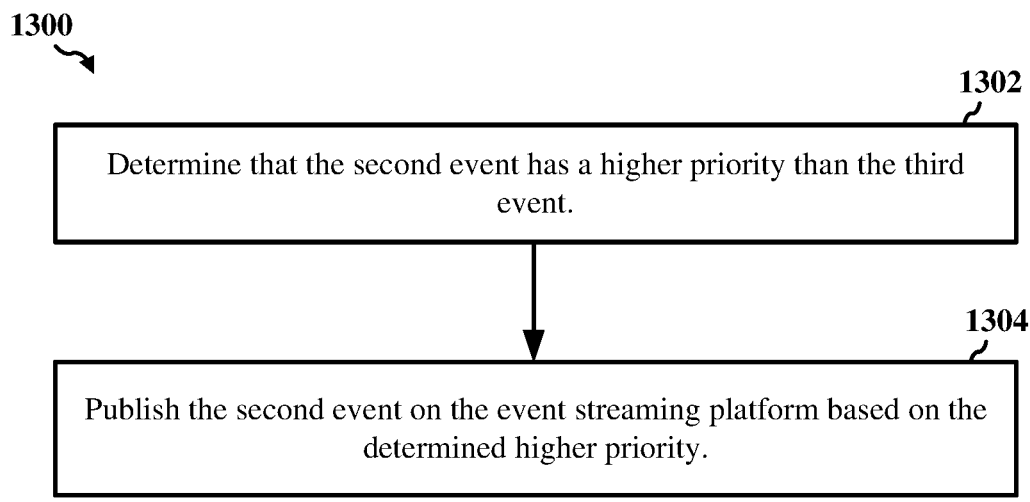
FIG. 13 shows an illustrative flow chart depicting another example operation for parsing and publishing event messages, according to some implementations.

FIG. 13 shows an illustrative flow chart depicting another example operation 1300 for parsing and publishing event messages, according to some implementations. The example operation 1300 may be performed by one or more processors of a computing device including or associated with the database, such as the message parsing and forwarding system 100 of FIG. 1. In other implementations, the example operation 1300 may be performed by any suitable systems, computers, or servers. In various implementations, the operation 1300 may be performed after the example operation 1200 described with reference to FIG. 12. For example, at block 1302, the message cleaning and publishing system 100 determines that the second event has a higher priority than the third event. At block 1304, the message cleaning and publishing system 100 publishes the second event on the event streaming platform based on the determined higher priority.

Figure 14:
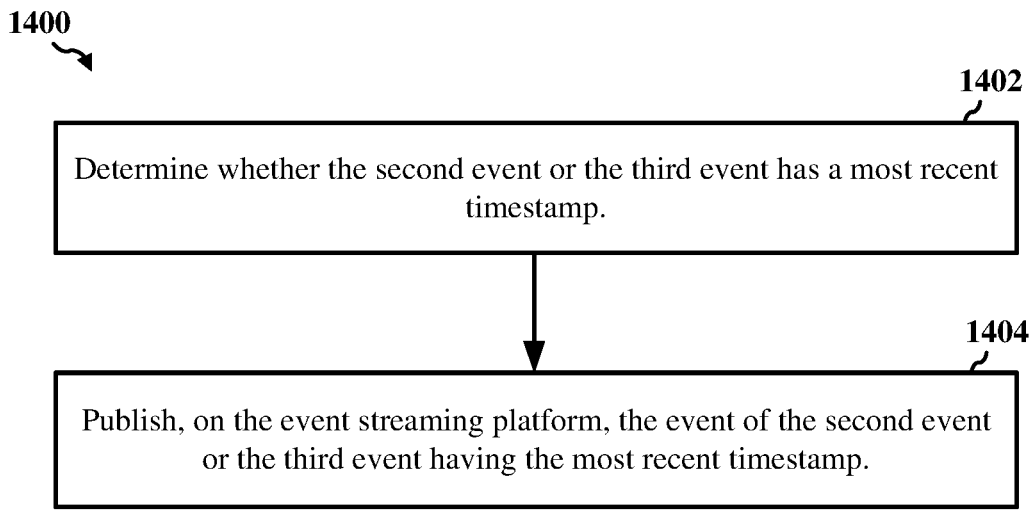
FIG. 14 shows an illustrative flow chart depicting another example operation for parsing and publishing event messages, according to other implementations.

FIG. 14 shows an illustrative flow chart depicting another example operation 1400 for parsing and publishing event messages, according to other implementations. The example operation 1400 may be performed by one or more processors of a computing device including or associated with the database, such as the message parsing and forwarding system 100 of FIG. 1. In other implementations, the example operation 1400 may be performed by any suitable systems, computers, or servers. In various implementations, the operation 1400 may be performed after the example operation 800 described with reference to FIG. 8. For example, at block 1402, the message cleaning and publishing system 100 determines whether the second event or the third event has a most recent timestamp. At block 1404, the message cleaning and publishing system 100 publishes, on the event streaming platform, the event of the second event or the third event having the most recent timestamp.

Figure 15:
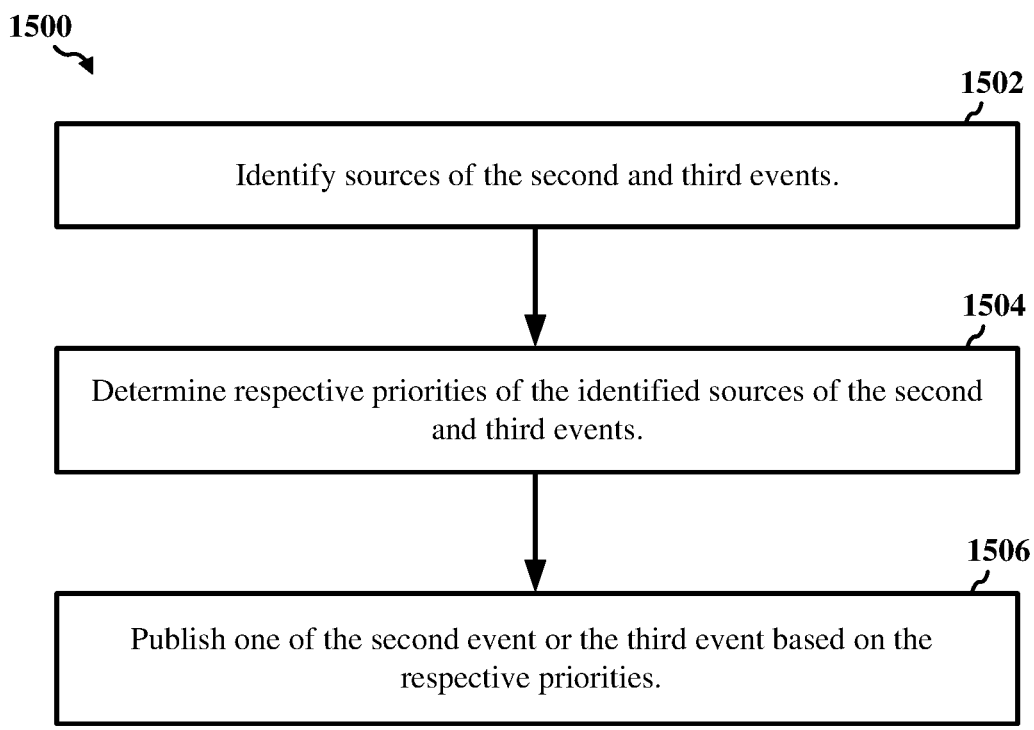
FIG. 15 shows an illustrative flow chart depicting another example operation for parsing and publishing event messages, according to some other implementations.

FIG. 15 shows an illustrative flow chart depicting another example operation 1500 for parsing and publishing event messages, according to some other implementations. The example operation 1500 may be performed by one or more processors of a computing device including or associated with the database, such as the message parsing and forwarding system 100 of FIG. 1. In other implementations, the example operation 1500 may be performed by any suitable systems, computers, or servers. In various implementations, the operation 1500 may be performed after the example operation 800 described with reference to FIG. 8. For example, at block 1502, the message cleaning and publishing system 100 identifies sources of the second and third events. At block 1504, the message cleaning and publishing system 100 determines respective priorities of the identified sources of the second and third events. At block 1506, the message cleaning and publishing system 100 publishes one of the second event or the third event based on the respective priorities.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

What is claimed is:

1. A method of publishing event messages, comprising:
receiving messages corresponding to a plurality of events from a database, each message indicating a changed entry in the database for an associated event;
identifying, for a first event of the plurality of events, one or more tables of the database corresponding to the first event that have at least one changed entry;
parsing a group of the received messages that share a common identifier associated with the first event;
assigning an event type to the first event and to the group of received messages associated with the first event based at least in part on a highest priority change type of the changed entries of the one or more identified tables of the database; and
publishing the group of received messages associated with the first event on an event streaming platform based on the assigned event type being the same for each message of the group of received messages, the event streaming platform configured to stream, in real-time, the group of received messages associated with the first event to downstream users over one or more signal lines.

2. The method of claim 1, further comprising:
determining that a first table of the one or more identified tables of the database is a primary table;
determining the change type corresponding to the first table; and
assigning the determined change type as the event type for the first event.

3. The method of claim 1, further comprising:
determining that none of the one or more identified tables of the database is a primary table; and
assigning an update event type as the event type for the first event.

4. The method of claim 1, further comprising:
identifying, for the first event, at least a first change and a second change in a primary table of the database; and
assigning the event type to the first event based at least in part on the highest priority change type corresponding to the first and second changes.

5. The method of claim 4, further comprising:
determining that the first change corresponds to a deletion in the primary table of the database; and
assigning a deletion event type as the event type for the first event.

6. The method of claim 4, further comprising:
determining that neither the first change nor the second change corresponds to a deletion in the primary table of the database;
determining that the first change corresponds to an insertion in the primary table of the database; and
assigning an insertion event type as the event type for the first event.

7. The method of claim 4, further comprising:
determining that neither the first change nor the second change corresponds to a deletion or an insertion in the primary table of the database; and
assigning an update event type as the event type for the first event.

8. The method of claim 1, further comprising:
identifying a second event and a third event that correspond to a common account;
selecting one of the second event or the third event for publishing on the event streaming platform based on relative priorities of the second and third events; and
sending a message indicating denial of event publication to a source of the non-selected one of the second event or the third event.

9. The method of claim 8, further comprising:
determining that the second event has a higher priority than the third event; and
publishing the second event on the event streaming platform based on the determined higher priority.

10. The method of claim 8, further comprising:
determining whether the second event or the third event has a most recent timestamp; and publishing, on the event streaming platform, the event of the second event or the third event having the most recent timestamp.

11. The method of claim 8, further comprising:
identifying sources of the second and third events;
determining respective priorities of the identified sources of the second and third events; and
publishing one of the second event or the third event based on the respective priorities.

12. The method of claim 1, wherein the messages corresponding to the plurality of events comprise two or more groups of messages, wherein each group of the two or more groups of messages corresponds to a respective event of the plurality of events.

13. A computing device for publishing event messages, the computing device comprising:
one or more processors; and
a memory coupled to the one or more processors, the memory storing instructions that, when executed by the one or more processors, cause the computing device to:
receive messages corresponding to a plurality of events from a database, each message indicating a changed entry in the database for an associated event;
identify, for a first event of the plurality of events, one or more tables of the database corresponding to the first event that have at least one changed entry;
parse a group of the received messages that share a common identifier associated with the first event;
assign an event type to the first event and to the group of received messages associated with the first event based at least in part on a highest priority change type of the changed entries of the one or more identified tables of the database; and
publish the group of received messages associated with the first event on an event streaming platform based on the assigned event type being the same for each message of the group of received messages, the event streaming platform configured to stream, in real-time, the group of received messages associated with the first event to downstream users over one or more signal lines.

14. The computing device of claim 13, wherein execution of the instructions further causes the computing device to:
determine that a first table of the one or more identified tables of the database is a primary table;
determine the change type corresponding to the first table; and
assign the determined change type as the event type for the first event.

15. The computing device of claim 13, wherein execution of the instructions further causes the computing device to:
determine that none of the one or more identified tables of the database is a primary table; and
assign an update event type as the event type for the first event.

16. The computing device of claim 13, wherein execution of the instructions further causes the computing device to:
identify, for the first event, at least a first change and a second change in a primary table of the database; and
assign the event type to the first event based at least in part on the highest priority change type corresponding to the first and second changes.

17. The computing device of claim 16, wherein execution of the instructions further causes the computing device to:
determine that the first change corresponds to a deletion in the primary table of the database; and
assign a deletion event type as the event type for the first event.

18. The computing device of claim 16, wherein execution of the instructions further causes the computing device to:
determine that neither the first change nor the second change corresponds to a deletion in the primary table of the database;
determine that the first change corresponds to an insertion in the primary table of the database; and
assign an insertion event type as the event type for the first event.

19. The computing device of claim 16, wherein execution of the instructions further causes the computing device to:
determine that neither the first change nor the second change corresponds to a deletion or an insertion in the primary table of the database; and
assign an update event type as the event type for the first event.

20. The computing device of claim 16, wherein execution of the instructions further causes the computing device to:
identify a second event and a third event that correspond to a common account;
select one of the second event or the third event for publishing on the event streaming platform based on relative priorities of the second and third events; and
send a message indicating denial of event publication to a source of the non-selected one of the second event or the third event.

* * * * *